United States Patent [19]
Miyagi et al.

[11] Patent Number: 5,748,579
[45] Date of Patent: May 5, 1998

[54] OPTICAL PICKUP FOR MAGNETO OPTICAL RECORDING APPARATUS

[75] Inventors: Takahiro Miyagi; Shigeru Takaya; Yoshifumi Masunaga, all of Tokorozawa, Japan

[73] Assignee: Pioneer Electronic Corporation, Tokyo-to, Japan

[21] Appl. No.: 606,313

[22] Filed: Feb. 23, 1996

[30] Foreign Application Priority Data

Feb. 24, 1995 [JP] Japan .................................. 7-061974

[51] Int. Cl.$^6$ ...................................................... G11B 7/08
[52] U.S. Cl. ...................................... 369/44.14; 360/114
[58] Field of Search ........................... 369/44.14, 44.15, 369/44.16, 44.21, 13; 360/114; 359/813, 814, 823, 824

[56] References Cited

U.S. PATENT DOCUMENTS

| | | | |
|---|---|---|---|
| 4,769,806 | 9/1988 | Takamori | 369/44.21 |
| 4,956,833 | 9/1990 | Kokado et al. | |
| 4,959,820 | 9/1990 | Horimai et al. | 369/13 |
| 5,126,983 | 6/1992 | Ikegame et al. | 360/114 |
| 5,239,532 | 8/1993 | Hensing et al. | 360/114 |
| 5,264,968 | 11/1993 | Masunaga | 369/44.16 |

FOREIGN PATENT DOCUMENTS

| | | |
|---|---|---|
| 0 382 553 | 8/1990 | European Pat. Off. |
| 61-24821 | 2/1986 | Japan . |
| 0058749 | 2/1990 | Japan .................................. 369/44.15 |
| 0044590 | 2/1994 | Japan .................................. 369/44.15 |

*Primary Examiner*—Thang V. Tran
*Attorney, Agent, or Firm*—Young & Thompson

[57] ABSTRACT

An optical pickup magneto-optically records information on a magneto optical disc in cooperation with a magnetic head. The optical pickup is disposed at one surface side of the magneto optical disc while the magnetic head is disposed at the other surface side of the magneto optical disc during a recording operation of the magneto optical disc. The optical pickup is provided with: a light emission device for emitting a light beam; an optical system for guiding the emitted light beam; an objective lens for converging and focusing the guided light beam onto the optical disc; and an actuator holding the objective lens and having a magnetic circuit for actuating the objective lens to move in focusing and tracking directions respectively of the magneto optical disc by a magnetic force generated by the magnetic circuit. The magnetic circuit includes a magnetic flux generation device for generating a magnetic flux and a yoke for transmitting the generated magnetic flux in the magnetic circuit to generate the magnetic force. The optical pickup is further provided with: a base plate, to which the actuator is attached, having a wall portion prescribing an aperture through which the light beam passing the objective lens is transmitted; and a body case having a wall prescribing an internal space and an opening, which opens toward the magneto optical disc and which is covered by the base plate, for accommodating the light emission device, the optical system and the magnetic circuit.

4 Claims, 4 Drawing Sheets

MAGNETIC FLUX FROM MAGNETO

OPTICAL PICKUP FOR MAGNETO OPTICAL RECORDING APPARATUS

BACKGROUND OF THE INVENTION

1. Field of the Invention

The present invention relates to an optical pickup for a magneto optical recording apparatus.

2. Description of the Related Art

There are various types of magneto optical recording apparatuses. For example, there is a magnetic field modulation type by use of an optical pickup, which is disposed at one surface side of the magneto optical disc, and a magnetic head, which is disposed at the other surface side of the magneto optical disc.

The recording operation of this magnetic field modulation type is performed as following.

Namely, a strong laser light beam having a first predetermined light intensity is applied by the optical pickup onto the magneto optical disc to increase the temperature of a portion of the magneto optical disc where the information is to be recorded, so that the magnetic coercive force of this portion be decreased. At the same time, the magnetic field, which is switched over to either one of the plus and minus polarities in correspondence with the binary value of the information to be recorded, is applied by the magnetic head onto the portion of the magneto optical disc, so that the portion of the magneto optical disc be magnetized with this applied magnetic field. On the other hand, the reproduction is performed by irradiating the magneto optical disc with a weak laser light beam having a second predetermined light intensity which is weaker than the aforementioned first predetermined light intensity used for recording, so as to detect the magnetic condition of the portion of the magneto optical disc.

In this magnetic field modulation type, since the magnetic head for recording the information and the optical pickup for irradiating the magneto optical disc with the laser light beam are disposed close to each other through the optical disc, if there is a leakage of the magnetic flux from the magnetic circuit for driving an objective lens in the optical pickup, it will harmfully influence the magnetic head, which is a problem.

Thus, in order to avoid this leakage of the magnetic flux from the optical pickup, the magnetic circuit in the lens driving mechanism may be constructed to have a set of main yokes for transmitting this magnetic flux for recording and additionally have an auxiliary yoke at the vicinity of the main yokes in the lens driving mechanism so as to form a closed magnetic loop with the main yokes and induce the magnetic flux, which is mainly leaked from the air gap of the main yokes, to the auxiliary yoke.

However, in this case, since the auxiliary yoke is additionally equipped in the lens driving mechanism at the vicinity of the main yokes, the lens driving mechanism of the optical pickup becomes thick, resulting in that it is difficult to reduce the size and thickness of the optical pickup.

Further, in the above mentioned optical pickup, the yoke base is fixed on a bottom surface of the body case, such that the yoke base, the magnetic circuit and the optical system are accommodated in the internal space of the body case. In the body case, the main yokes stand on the yoke base toward the opening of the body case which is directed to the magneto optical disc. Thus, in order to cover the opening of the base case, a cover exclusively used as a cover is put on the opening of the body case.

SUMMARY OF THE INVENTION

It is therefore an object of the present invention to provide an optical pickup, which can prevent the leakage of the magnetic flux from the optical lens driving mechanism of the optical pickup, and which can be easily reduced in its size and thickness.

The above object of the present invention can be achieved by an optical pickup for magneto optically recording information on a magneto optical disc in cooperation with a magnetic head. The optical pickup is disposed at one surface side of the magneto optical disc while the magnetic head is disposed at the other surface side of the magneto optical disc during a recording operation of the magneto optical disc. The optical pickup is provided with: a light emission device for emitting a light beam; an optical system for guiding the emitted light beam; an objective lens for converging and focusing the guided light beam onto the optical disc; an actuator holding the objective lens and having a magnetic circuit for actuating the objective lens to move in focusing and tracking directions respectively of the magneto optical disc by a magnetic force generated by the magnetic circuit, the magnetic circuit including a magnetic flux generation device for generating a magnetic flux and a yoke for transmitting the generated magnetic flux in the magnetic circuit to generate the magnetic force; a base plate, to which the actuator is attached, having a wall portion prescribing an aperture through which the light beam passing the objective lens is transmitted; and a body case having a wall prescribing an internal space and an opening, which opens toward the magneto optical disc and which is covered by the base plate, for accommodating the light emission device, the optical system and the magnetic circuit.

According to the present invention, a light beam is emitted by the light emission device, is guided by the optical system, and is converged and focused onto the optical disc by the objective lens. At this time, the objective lens is actuated to move in the focusing and tracking directions respectively by a magnetic force generated by the magnetic circuit of the actuator, while the light beam passing through the objective lens is transmitted through the aperture of the base plate. The magnetic circuit includes a magnetic flux generation device for generating a magnetic flux and a yoke for transmitting the generated magnetic flux in the magnetic circuit to generate the magnetic force. The actuator having the magnetic circuit is attached on the base plate, and is accommodated in the internal space of the body case, which is covered by the base plate. Thus, since the magnetic circuit of the actuator is located distant from the magnetic head, the harmful influence of the leaked magnetic flux generated from the magnetic circuit can be reduced by use of a relatively simple construction. Thus, it is possible to reduce the thickness and size of the optical pickup. Furthermore, since the body case is covered by the base plate, the invasion of dust etc. can be efficiently prevented without the use of a cover exclusive for covering the body case, resulting in that the number of the constitutional elements can be reduced and that the reduction of the thickness and size of the optical pickup can be even more promoted.

As one aspect of the present invention, the base plate comprises a magnetic substance for shielding the magnetic circuit from the magnetic head. In this case, the leaked magnetic flux from the magnetic circuit can be efficiently shut off by the base plate, so that the harmful influence of the leaked magnetic flux to the magnetic head can be drastically reduced.

As another aspect of the present invention, the yoke has a first portion, which stands from the base plate, and a second portion, which stands from the base plate and is opposed to the first portion, and a U shaped bottom portion, which are integrally connected with the first portion at one end thereof and with the second portion at the other end thereof, such that the U shaped bottom portion is protruded from the base plate toward the magneto optical disc and that each of said first and second portions stands in a direction away from said magneto optical disc. Thus, the construction of the yoke and the base plate can be made simplified since they can be formed as one member. Further, because of the U shaped portion protruded from the base plate, it is possible to function the U shaped portion as a stopper of the actuator not to abut the objective lens to the magneto optical disc.

In this case, the first and second portions, the U shaped bottom portion and the base plate are preferably integrally formed of a magnetic substance. Thus, the yoke and the base plate can be formed of one piece of the magnetic substance. In this case, the magnetic circuit may have a magneto fixed on the first portion such that an air gap is formed between the magneto and the second portion. Thus, the magnetic flux leaked from the magnetic circuit, which is mainly leaked from the air gap, can be efficiently shut off by the base plate, while the harmful influence of the leaked magnetic flux from the air gap onto the magnetic head can be reduced because the air gap is located distant from the magnetic head.

As another aspect of the present invention, the yoke has a first portion, which stands from the base plate, and a second portion, which stands from the base plate and is opposed to the first portion, such that a portion of the base plate between the first and the second portions functions as a portion of the yoke and that each of said first and second portions stands in a direction away from said magneto optical disc. Thus, the construction of the yoke and the base plate can be made simplified since they can be formed as one member.

In this case, the first and second portions and the base plate are preferably integrally formed of a magnetic substance. Thus, the yoke and the base plate can be formed of one piece of the magnetic substance. In this case, the magnetic circuit may have a magneto fixed on the first portion such that an air gap is formed between the magneto and the second portion. Thus, the magnetic flux leaked from the magnetic circuit, which is mainly leaked from the air gap, can be efficiently shut off by the base plate, while the harmful influence of the leaked magnetic flux from the air gap onto the magnetic head can be reduced because the air gap is located rather distant from the magnetic head.

As another aspect of the present invention, the magnetic flux generation device may be provided with a print board and a driving coil printed on the print board for generating the magnetic flux. Thus, the construction of the driving coil can be made rather simplified by use of the print technique.

As another aspect of the present invention, the objective lens is actuated to move in the focusing and tracking directions through the aperture of the base plate. Thus, the light beam can be irradiated without any problem while the light emission device and the optical system are accommodated in the body case and is covered with the base plate.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, an embodiment of the present invention will be now explained.

Figure 1:
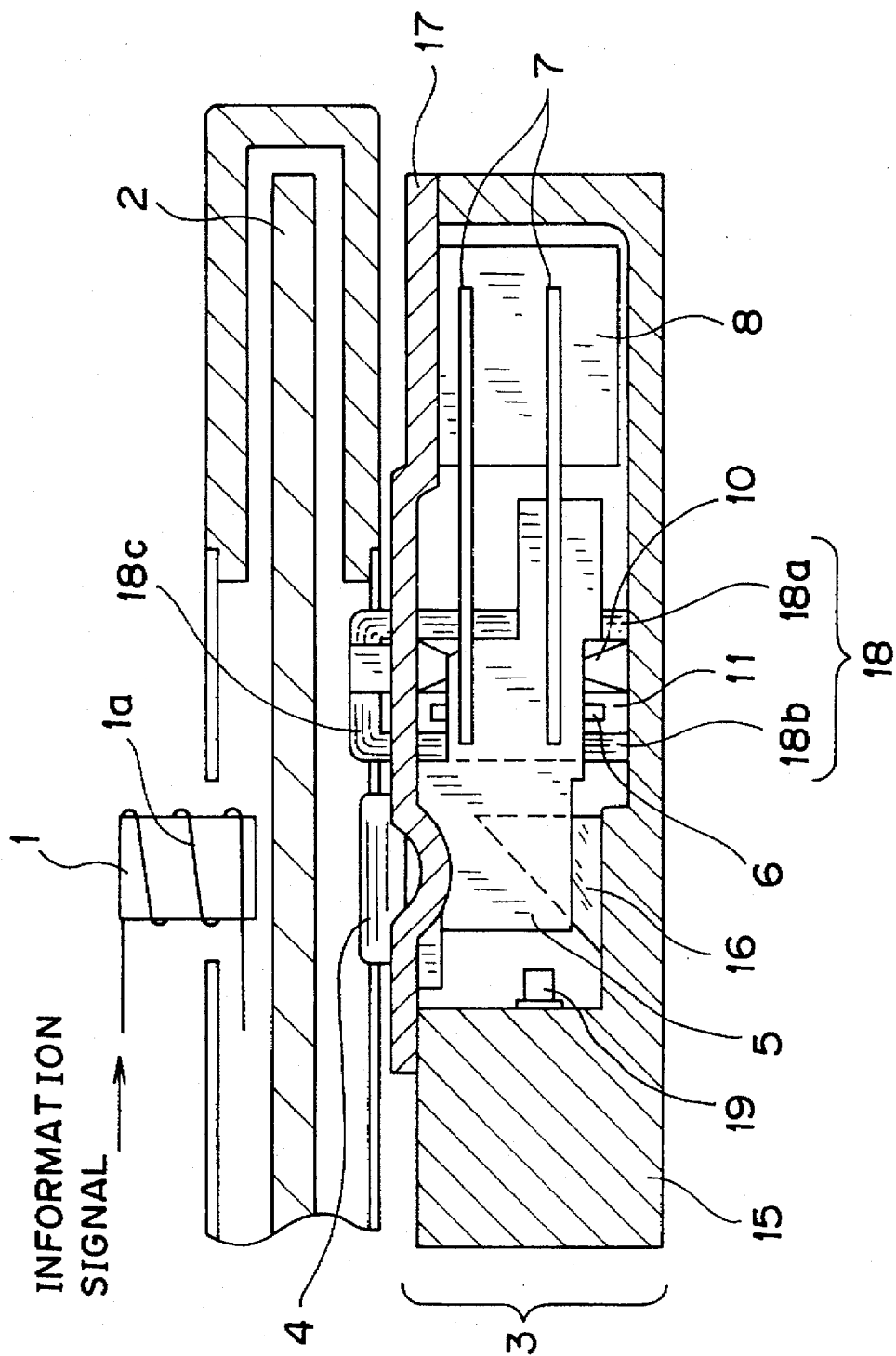
FIG. 1 is a partially broken cross sectional view of an optical pickup as an embodiment of the present invention.

FIG. 1 shows a construction of an optical pickup as an embodiment of the present invention.

In FIG. 1, a magnetic head 1 is disposed at one side of a magneto optical disc 2, and an optical pickup 3 as the embodiment of the present invention is disposed at the other side of the magneto optical disc 2 in a magneto optical disc player.

The magnetic head 1 generates the magnetic field for the recording operation. The magnetic head 1 is provided with a coil 1a to modulate the generated magnetic field in accordance with the information to be recorded. The magneto optical disc 2 is an optical disc having a magnetic layer in which an information bit can be re-written by means of the perpendicular magnetization of the magnetic layer. The magneto optical disc player is constructed to record information onto the magneto optical disc 2 by use of the magnetic head 1 and the optical pickup 3 and to reproduce the recorded information from the magneto optical disc 2 by use of the optical pickup 3.

In FIG. 1, the optical pickup is provided with an objective lens 4, a lens holder 5, a driving coil 6, a suspension 7, a suspension holding member 8, a magneto 10, an air gap 11, a body case 15, a rising up mirror 16, a yoke base 17, a yoke 18 and a semiconductor laser 19.

The optical pickup 3 is constructed such that the laser light beam emitted from the semiconductor laser 19 is reflected by the rising up mirror 16 toward the objective lens 4, is converged by the objective lens 4, and is applied onto the magneto optical disc 2. The magnetic head 1 and the optical pickup 3 are closely opposed to each other and arranged on one axis such that a portion of the magneto optical disc 2 where the information is to be recorded is interposed between the magnetic head 1 and the optical pickup 3.

The lens holder 5 comprises a non-magnetic substance such as composite resin, aluminum, etc., and is constructed to hold the objective lens 4.

Figure 2:
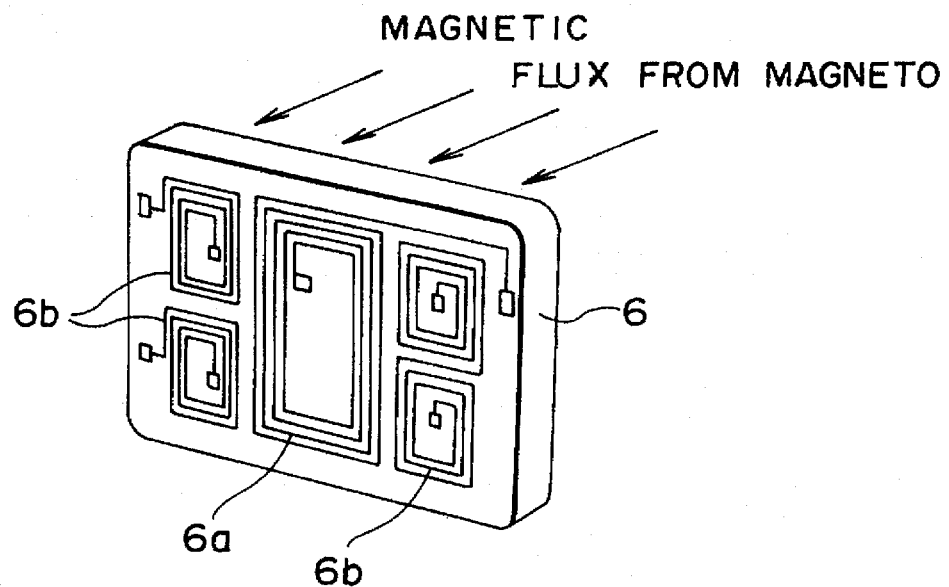
FIG. 2 is a perspective view of a driving coil of the optical pickup of FIG. 1.

The driving coil 6 consists of printed coils for driving the objective lens 4, which are printed on a print substrate. On this print substrate of the driving coil 6, the land for electric connections is also printed. For example, a focus direction driving coil and a tracking direction driving coil may be printed on this print substrate of the driving coil 6, so that those driving coils are formed as one body as shown in FIG. 2. In FIG. 2, a focus direction driving coil 6a and a set of tracking direction driving coils 6b are printed on the print substrate. The focus direction coil 6a is constructed to generate the magnetic flux to react the magnetic flux from the magneto 10 so as to move the objective lens 4 in the focusing direction. The tracking direction driving coils 6b are constructed to generate the magnetic flux to react the magnetic flux from the magneto 10 so as to move the objective lens 4 in the tracking direction. Alternatively, those driving coils may be formed separately as separated bodies. Further, the driving coil 6 may be wound around the lens holder 5.

Figure 3:
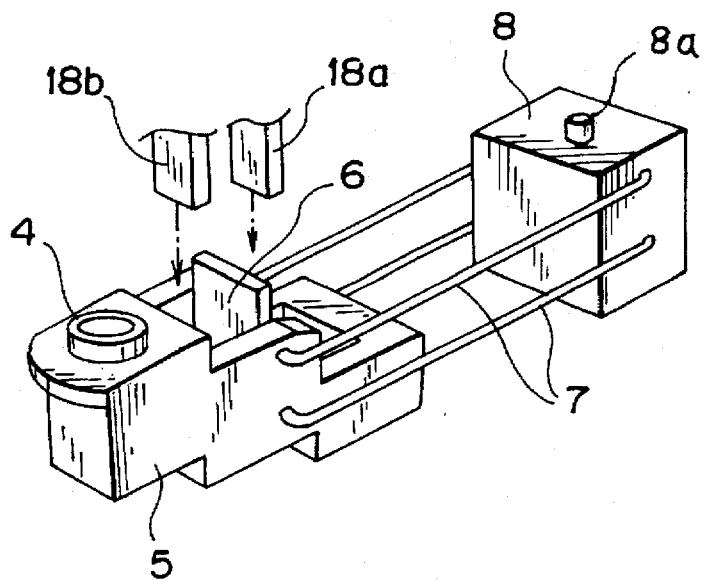
FIG. 3 is a perspective view of an actuating portion of the optical pickup of FIG. 1.

In FIG. 1, the suspension 7 has a plurality of metal beams each of which is flexible in each of the focusing and tracking directions, and is connected to the suspension holding member 8 at one end thereof, and is connected to the lens holder 5 at the other end thereof, so as to hold the lens holder 5 movably in the focusing and tracking directions with respect to the suspension holding member 8, as shown in FIG. 3.

The body case 15 has a pair of V shaped seat portions for abutting to the concave curved portions of the yoke base 17, which is located at the vicinity of the objective lens 4 in FIG. 1 such that the inclination of the yoke base 17 as well as the objective lens 4 can be adjusted by slightly rotating the yoke base 17 around the concave curved portions which abut to the upper faces of the V shaped portions.

Figure 4:
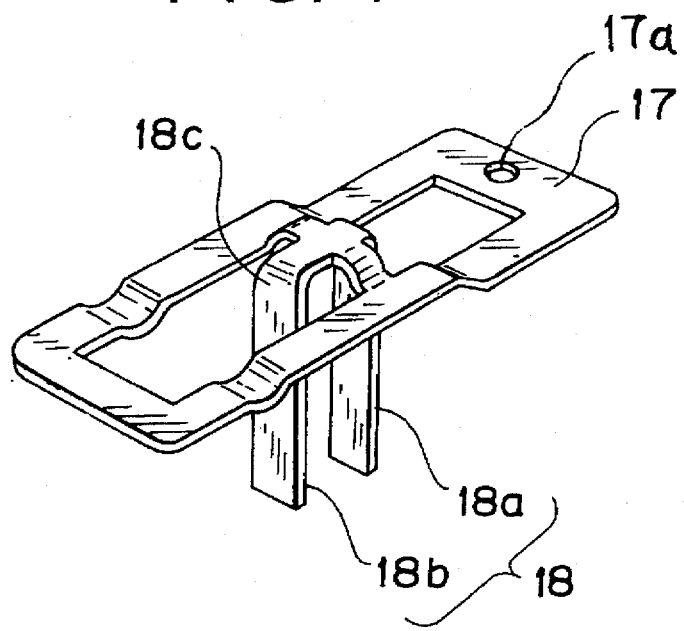
FIG. 4 is a perspective view of one example of a yoke used for the optical pickup of FIG. 1.

The yoke base 17 comprises a magnetic substance such as an iron plate. The suspension holding member 8 is fixed on the yoke base 17. The yoke base 17 has an aperture 17a as shown in FIG. 4 which is engaged with a protruded portion 8a as shown in FIG. 3 of the suspension holding member 8 so that the lens holder 5 and the yoke 18 are connected here.

The yoke 18 comprises a magnetic substance such as an iron plate, and consists of three portions as shown in FIG. 1. Namely, the yoke 18 has two standing portions 18a and 18b, which are parallel and opposed to each other and each of which stands up perpendicularly from the yoke base 17, and also has a U shaped bottom portion 18c, which bottom wall is parallel to the surface of the yoke base 17. The yoke 18 is formed by punching out predetermined portions of the yoke base pre-form and bending the punched out portions to be the standing portions 18a and 18b and the U shaped bottom portion 18c, so that the yoke 18 and the yoke base 17 are integrally formed of one piece of the magnetic substance, as shown in FIG. 4. The U shaped bottom portion 18c functions as a stopper for restricting the movable range of the lens holder 5 such that a stopper portion of the lens holder 5 abuts to the U shaped bottom portion 18c and that the objective lens 4 will not abut to the magneto optical disc 2 when the lens holder 5 moves in the focusing direction toward the magneto optical disc 2.

Figure 5:
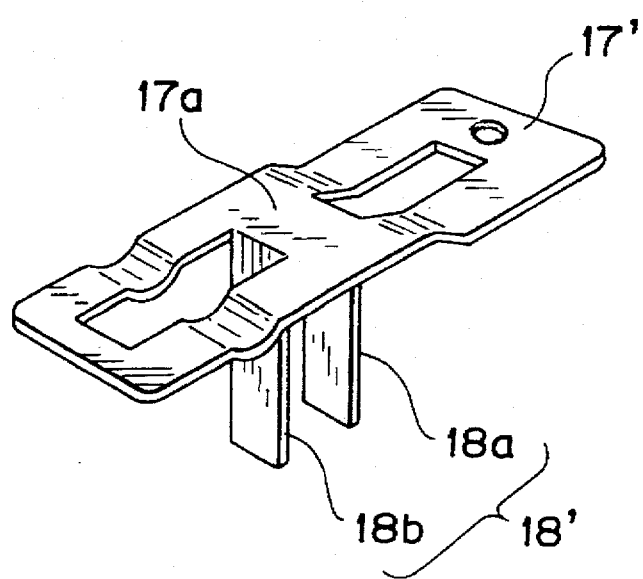
FIG. 5 is a perspective view of another example of a yoke usable for the optical pickup.

In FIG. 1, the U shaped bottom portion 18c of the main yoke 18 is protruded from the external surface of the yoke base 17 toward the side of the magneto optical disc 2. Alternatively, the yoke base 17 may be constructed to be the U shaped bottom portion of the yoke 18, as shown in FIG. 5. In FIG. 5, a yoke 18' has the standing portion 18a and the standing portion 18b, and a yoke 17' has a portion 17a corresponding to the U shaped bottom portion 18c of FIG. 4.

Figure 6:
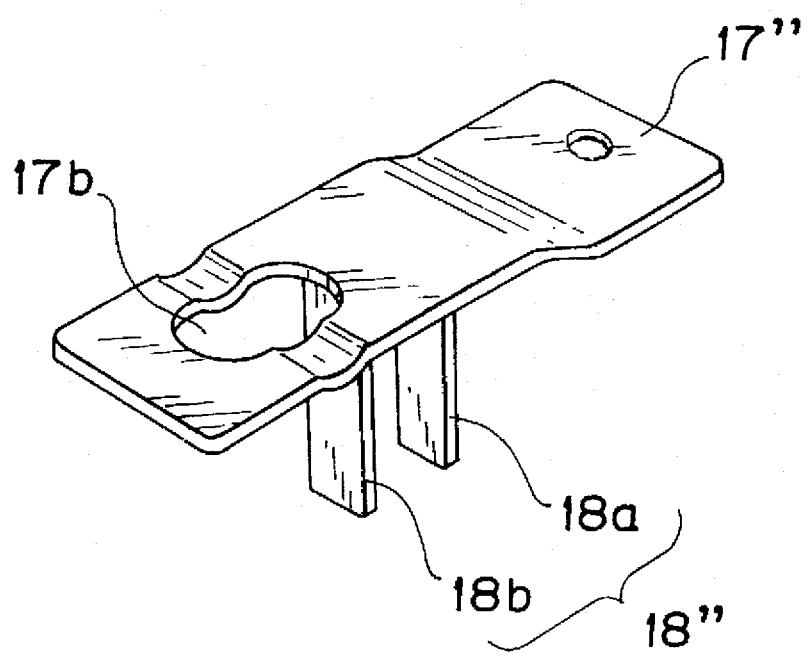
FIG. 6 is a perspective view of another example of a yoke usable for the optical pickup.

The yoke base 17 has an aperture through which the objective lens 4 can move. By setting the yoke base 17 on the body case 15, the standing portions 18a and 18b of the yoke 18, the driving coil 6, etc. can be accommodated in the internal space of the body case 15, such that the yoke base 17 functions as a cover to prevent dusts from entering the internal space of the body case 15. In order to improve this function as the cover, the yoke base and the yoke may be constructed as shown in FIG. 6. In FIG. 6, a yoke 18" has the standing portion 18a and the standing portion 18b which are attached to a yoke base 17". The yoke base 17" has an aperture 17b which has a size just fit to the objective lens 4 to pass therethrough.

In FIG. 1, the magneto 10 is fixed on the standing portion 18a of the yoke 18, such that the air gap 11 of the magnetic circuit is formed between the magneto 10 and the standing portion 18b of the yoke 18. The magnetic flux emitted from the magneto 10 transmits through the air gap 11, the standing portion 18b, the U bottom portion 18c and the standing portion 18a and returns to the magneto 10 to form a closed magnetic circuit. The leakage of the magnetic flux from this magnetic circuit is generated mainly from the peripheral of the air gap 11. Thus, since this air gap 11 of the magnetic circuit is located distant from the magnetic head 1, the harmful influence to the magnetic head 1 by the leaked magnetic flux of the magnetic circuit can be drastically reduced. Since the yoke base 17 comprises a magnetic substance, the leaked magnetic flux can be shut off with respect to the magnetic head 1 by virtue of this yoke base 17.

The focusing direction driving coil and the tracking direction driving coil of the driving coil 6 fixed on the lens holder 5 are suspended in the space by the suspension 7 such that one portion of each of the focusing and tracking direction driving coils is interlinked with the parallel magnetic flux (i.e. the magnetic flux in the direction parallel to the plane of FIG. 1) in the air gap 11 of the magnetic circuit.

Nextly, the operation of the optical pickup 3 will be explained.

During the recording operation of the magneto optical disc player, the laser light beam is emitted from the semiconductor laser 19 and is focused on the magneto optical disc 2 by the objective lens 4. When the objective lens 4 is to be moved in the focusing direction under the focus servo control, the electric current is supplied to the focusing direction driving coil of the driving coil 6 and the driving force is generated in the focusing direction so that the objective lens 4 can be moved through the aperture of the yoke base 17 in the focusing direction and that the laser light beam can be focused onto the portion of the magneto optical disc 2 where the information is to be recorded. When the objective lens 4 together with the laser irradiation optical system is to be moved in the tracking direction under the tracking servo control, the electric current is applied to the tracking direction driving coil of the driving coil 6, and the driving force is generated in the tracking direction so that the objective lens 4 together with the laser irradiation optical system can be moved in the tracking direction and that the laser light beam can be irradiated onto the track including the portion of the magneto optical disc 2 where the information is to be recorded.

During those driving operations of the driving coil 6, the magnetic flux is generated in the magnetic circuit. However, since the air gap 11 of the magnetic circuit is located distant from the magnetic head 1, the harmful influence of the leaked magnetic flux, which is mainly leaked from the air gap 11 of the magnetic circuit, onto the magnetic head 1 can be drastically reduced. Further, during the driving operation in the focusing direction of the driving coil 6, the abutment of the objective lens 4 to the magneto optical disc 2 can be prevented by the U shaped bottom portion 18c of the yoke 18 which functions as the stopper of the lens holder 5. Thus, the magnetic field modulating operation can be performed correctly and precisely without the problem due to the leaked magnetic flux according to the present embodiment.

The present embodiment is applied to the magnetic field modulating type. However, the present invention can be applied to any recording type as long as it is the apparatus for magneto optically recording the information by use of the optical pickup and the magnetic head.

As described above in detail, according to the present embodiment, since the air gap 11 of the magnetic circuit is located distant from the magnetic head 1, the harmful influence of the leaked magnetic flux generated from the air gap 11 of the magnetic circuit can be reduced by use of a relatively simple construction. Thus, it is possible to reduce the thickness and size of the optical pickup 3. Further, since the yoke base 17, which is located between the air gap 11 of the magnetic circuit and the magnetic head 1, comprises the magnetic substance, the leaked magnetic flux from the air gap 11 can be efficiently shut off by the yoke base 17, so that the harmful influence of the leaked magnetic flux to the magnetic head 1 can be drastically reduced. Furthermore, since the yoke base 17 is attached on the body case 15 to cover the opening of the body case 15, the invasion of dust etc. can be efficiently prevented without the use of a cover which is exclusively used for covering the body case, resulting in that the number of the constitutional elements can be reduced and that the reduction of the thickness and size of the optical pickup 3 can be even more promoted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup for a magneto optically recording information on a magneto optical disc in cooperation with a magnetic head, said optical pickup being disposed at one surface side of said magneto optical disc while said magnetic head being disposed at the other surface side of said magneto optical disc during a recording operation of said magneto optical disc, said optical pickup comprising:

a light emission means for emitting a light beam;

an optical system for guiding the emitted light beam;

an objective lens for covering and focusing the guided light beam onto said optical disc;

an actuator holding said objective lens and having a magnetic circuit for actuating said objective lens to move in focusing and tracking directions respectively of said magneto optical disc by a magnetic force generated by said magnetic circuit, said magnetic circuit including a magnetic flux generation means for generating a magnetic flux and a yoke for transmitting the generated magnetic flux in said magnetic circuit to generate the magnetic force, said magnetic circuit being located at a place offset from an axis of said objective lens;

a base plate, to which said actuator is attached, having a wall portion prescribing an aperture through which the light beam passing through said objective lens is transmitted, said base plate comprising a magnetic substance for shielding said magnetic circuit from said magnetic head, said yoke including a first portion, which extends from said base plate, a second Portion, which extends from said base Plate and is opposed to said first portion, and a U-shaped bottom portion integrally connected to said first portion at one end thereof and to said second portion at the other end thereof, such that said U shaped bottom portion extends from said base plate toward said magnet optical disc, each of said first and second portions extending in a direction away from said magneto optical disc; and a body case having a wall prescribing an internal space and an opening, which opens toward said magneto optical disc and which is covered by said base plate, for accommodating said light emission means, said optical system and said magnetic circuit.

2. An optical pickup according to claim 1, wherein said first and second portions, said U shaped bottom portion and said base plate are integrally formed.

3. An optical pickup according to claim 1, wherein said magnetic circuit comprises a magneto fixed on said first portion such that an air gap is formed between said magneto and said second portion.

4. An optical pickup according to claim 1, wherein said objective lens is actuated to move in the focusing and tracking directions through said aperture of said base plate.

* * * * *